May 22, 1928.
E. C. BALDON
1,670,432
JOINT FOR COMBINATION LEVELS AND SQUARES
Filed Dec. 30, 1923   3 Sheets-Sheet 1
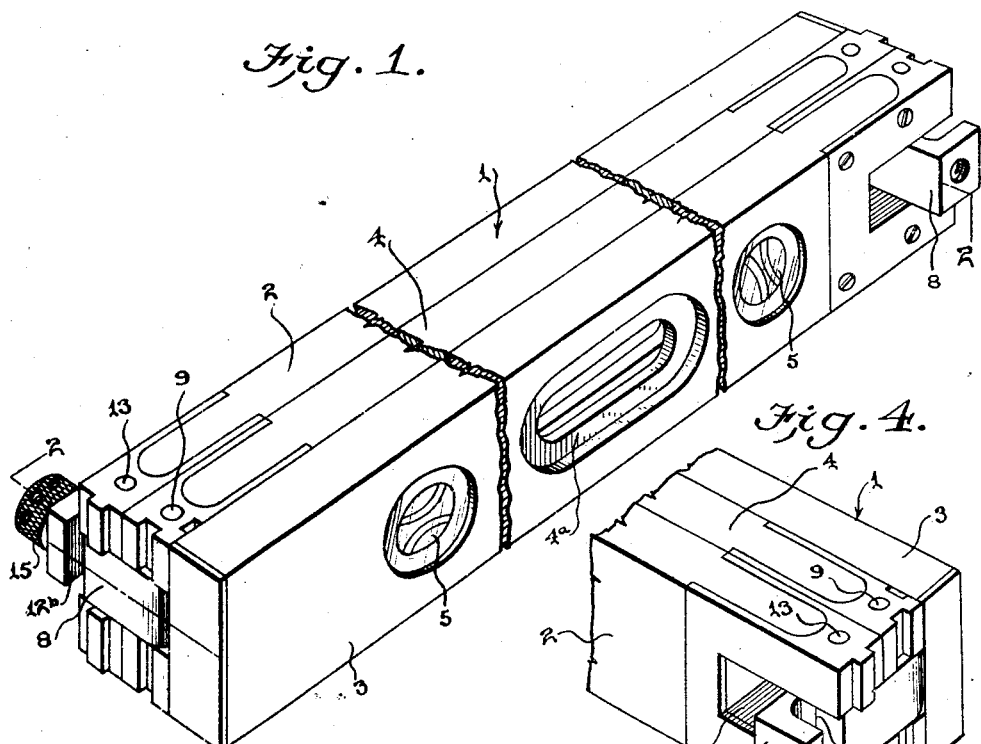
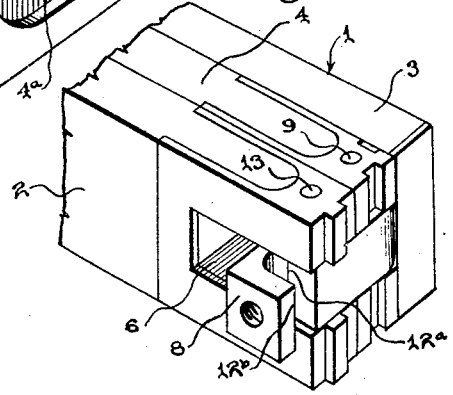
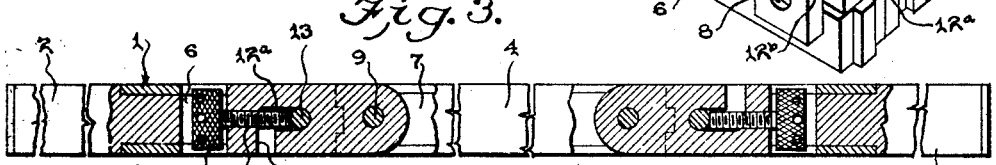
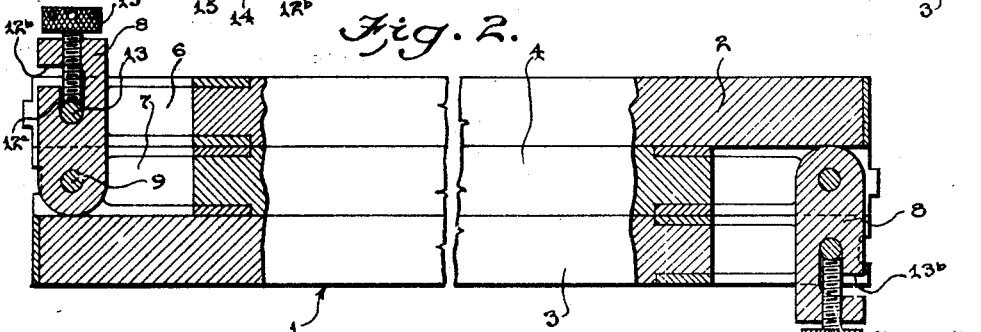
Inventor
Earle C. Baldon May 22, 1928.  
E. C. BALDON  
1,670,432  
JOINT FOR COMBINATION LEVELS AND SQUARES  
Filed Dec. 30, 1925  3 Sheets-Sheet 2
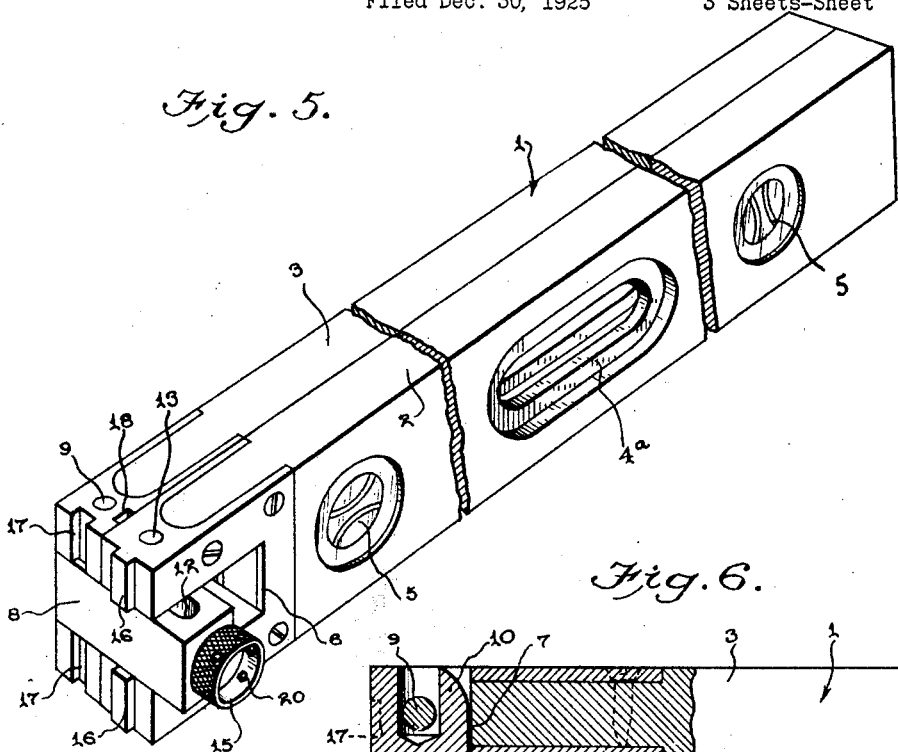
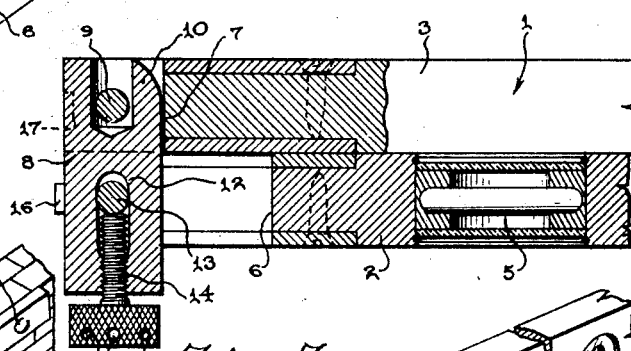
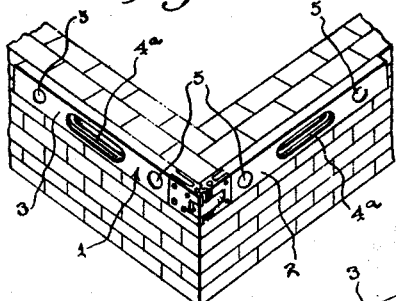
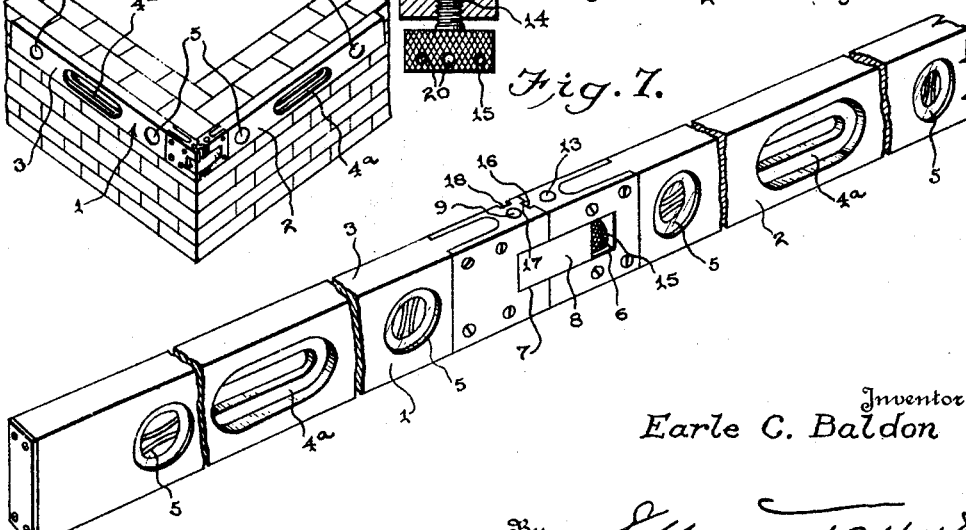
Inventor  
Earle C. Baldon  
By  
Attorney May 22, 1928.　　　　　　　　　　　　　　　1,670,432
E. C. BALDON
JOINT FOR COMBINATION LEVELS AND SQUARES
Filed Dec. 30, 1925　　　3 Sheets-Sheet 3
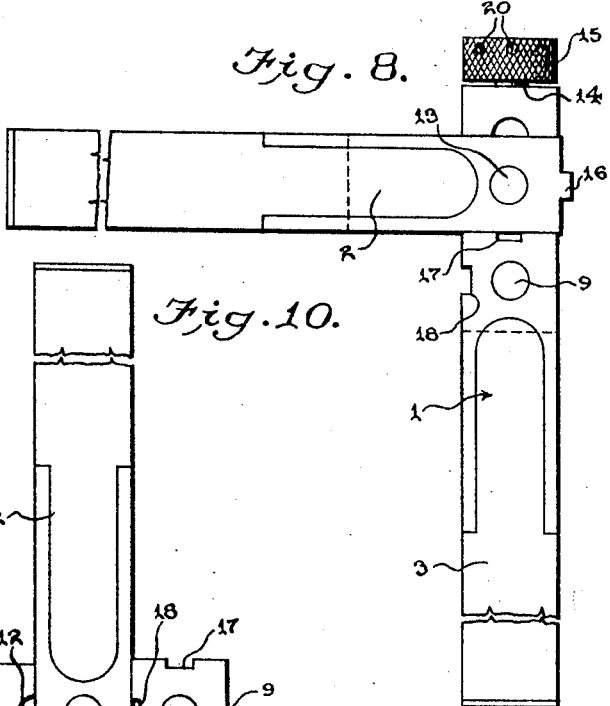
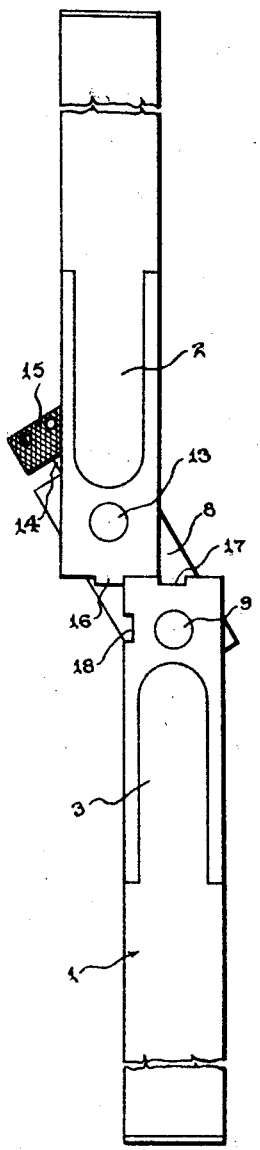
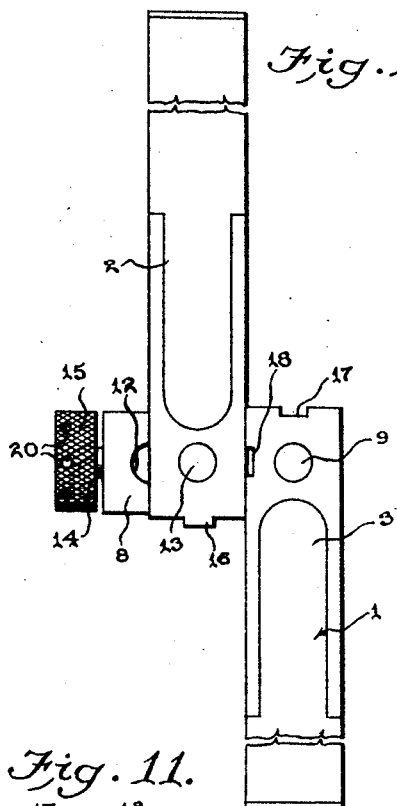
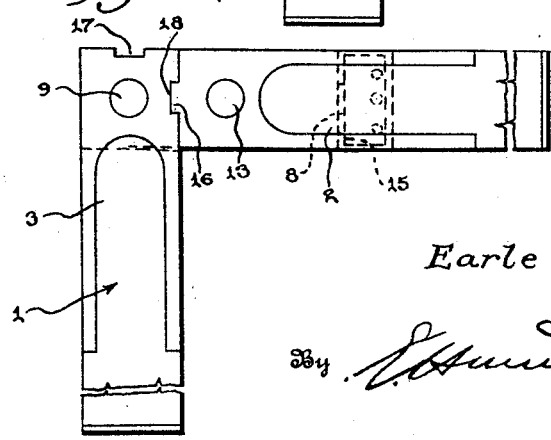
Inventor
Earle C. Baldon Patented May 22, 1928.

1,670,432

UNITED STATES PATENT OFFICE.

EARLE C. BALDON, OF KNOXVILLE, TENNESSEE.

JOINT FOR COMBINATION LEVELS AND SQUARES.

Application filed December 30, 1925. Serial No. 78,388.

Bricklayers, carpenters and like mechanics have use for a spirit level and also a square, and the purpose of the present invention is to provide a single tool convertible for use as a level or as a square, the primary object being to provide such a tool which is capable of folding in a small compass, easy to handle and carry as well as easy to place in storage.

To accomplish this result, a further purpose is to provide an improved joint for connecting the sections of the tool, whereby the sections may be held in parallelism, or in alignment end to end, or may extend in the same direction and offset laterally, or a section held at right angles to one of the other sections, whereby the tool may be used as a square.

A still further purpose is to provide a joint comprising the bifurcated ends of the sections of the square, with a link engaged in the bifurcations, one end of the link being pivoted, the other end of the link having a transverse slot to also receive a pivot pin, in conjunction with an adjustable screw for tightening the pin in the slot for holding the sections of the tool in various positions, as illustrated in the drawings.

Another purpose is to provide a plurality of joints for combination levels and squares, thereby constructing a level or square consisting of a plurality of sections, preferably of three sections, whereby the intermediate section may be removed and the end sections connected to each other. It is obvious that the tool may consist of as many sections as may be desired, so as to provide a tool of this character of any length.

Still another purpose is to provide a joint for a tool of this kind constructed in order to render the sections of the tool easily detachable, so that as many or as few sections as possible may be used in the construction of the tool.

It is to be understood that the particulars herein given are in no way limitative and that, while still keeping within the scope of the invention, any desired modifications of detail and desired proportions may be made in the apparatus according to the circumstances.

The invention comprises further features and combinations of parts to be hereinafter set forth, shown in the drawings and claimed.

In the drawings:

Figure 1 is a view in perspective of a combined level and square, showing the same constructed of a plurality of sections folded in parallelism and illustrating the joint applied and constructed in accordance with the invention.

Figure 2 is a longitudinal sectional view through Figure 1 on line 2—2 thereof.

Figure 3 is a longitudinal sectional view through the combined level and square, showing the sections unfolded.

Figure 4 is a perspective view of the adjacent connected ends of two sections, showing more especially the particular construction of the link which connects the sections.

Figure 5 is a view of a combined level and square, showing the same constructed in two sections folded in parallelism and also illustrating the joint applied.

Figure 6 is a longitudinal sectional view through the joined ends of the two sections in Figure 1, more clearly showing the detail construction of the joint.

Figure 7 is a view showing the two sections unfolded and in alignment with each other end to end.

Figure 8 is a view of the two sections disposed at right angles to each other.

Figure 9 is a view with the sections extending in the same direction but one offset from the other.

Figure 10 is a view similar to Figure 9, showing the sections offset a greater distance than in Figure 9.

Figure 11 is a view showing the two sections at right angles to each other but their ends connected in a different manner to that shown in Figure 8.

Figure 12 is a detail view in perspective showing the square and level on a corner wall.

Referring to the drawings, 1 designates the combined level and square as a whole which may be constructed of any suitable material, preferably aluminum or an alloy metal. However, the tool may be constructed in two or as many sections as may be desired and in either case, the sections may be of wood stock with their adjacent connected ends joined by plates, the plates being secured to the ends of the wood stock.

The level and square consists of a plurality of sections 2, 3 and 4, the sections 2 and 3 being employed at the ends of the tool while the section 4 constitutes an intermediate element of the level and square. The sections are provided with elongated openings 4ᵃ in which the hand of an operator may engage for handling the tool conveniently. The various sections carry double spirit levels 5 adjacent the joined ends of the sections and double spirit leveling glasses adjacent the remote ends of the sections, the latter spirit leveling glasses being disposed at right angles to those adjacent the joined ends of the sections for the purpose of plumbing various objects.

The adjacent ends of the sections 2 and 4 and the adjacent ends of the sections 3 and 4, as shown in Figures 1 to 4 inclusive, have relatively deep bifurcations 6 and 7. A link 8 is pivoted in the bifurcation 7 upon a transverse pin 9. The link at its end opposite the pin 9 has an elongated slot 12ᵃ which is L-shaped. In other words, the slot 12ᵃ opens at the side of the link, as shown at 12ᵇ, and passing through the slot is a pin 13 which passes transversely of the joined end of the section 2. The slot permits the link to have a sliding as well as a pivotal movement on the pin.

Threaded in one end of the link or coupling in a direction longitudinally of the slot is a screw 14 provided with a head 15, the screw acting to engage with the transverse pin 13 so as to hold the link or coupling in the various positions illustrated in the several views of the drawings, for the purpose of holding the sections in the positions illustrated. Obviously, as long as the screw is adjusted beyond the side opening 12ᵇ of the slot 12ᵃ, it is impossible to detach the link from engagement with the transverse pin 13. However, when the screw 14 is adjusted sufficiently from one end of the link so as to bring the end of the screw flush with the end wall of the slot and sufficiently out of the path of the pin 13, the pin is capable of passing through the side opening 12ᵇ to allow the link to be detached, and when detached, it is possible to disconnect the several sections of the level or square and allow the two end sections to be connected together. Obviously, as many sections as desired may be used in the square or level.

However, referring to Figures 5 to 11 inclusive, it will be seen that the section 2 of the tool has a relatively deep bifurcation similar to the bifurcation 6 shown in Figures 1 to 4 while the adjacent end of the section 3 has a bifurcation similar to the bifurcation 7 in Figures 1 to 4 but substantially one-half the depth of the bifurcation 6. Also, in Figures 5 to 11, inclusive, the link or coupling 8 engages both of the bifurcations. Figures 5 to 11, inclusive, show the intermediate section 4 removed and the two end sections connected. One end of the connecting link or coupling is pivotally mounted in the bifurcation 7 on a transverse pin. One corner of the link or coupling 8 in Figures 5 to 11, where it engages with the bifurcation 7, is rounded off, as at 10, so as to allow the link to pivot in one direction in the bifurcation or to permit the section 3 to pivot in one direction on the link, although it is possible in Figures 1 to 4 to move the various sections in either direction on their pivotal connections.

Referring to Figures 5 to 11, inclusive, it will be noted that the link has a transverse slot 12 in its end portion opposite the end which is pivoted in the bifurcation 7 and the pin 13 passes transversely of the joined end of the section 2 and through the slot 12, so as to permit the link to have sliding as well as pivotal movements. Also, in Figures 5 to 11, inclusive, a screw 14 with a head 15 is threaded into one end of the link and acts to engage with the transverse pin 13, so as to hold the link or coupling in various positions as illustrated in the several views of the drawings, for the purpose of holding the two sections (shown in Figures 5 to 11) in the various positions illustrated.

It is obvious that by tightening up on the screw, it is possible to hold the sections of the level and square in their different fixed positions. When the two sections 2 and 3 are disposed at right angles to each other, the tool may be used as a square, either as in Figure 8 or as in Figure 11. The screw also holds the two sections in parallelism or in alignment or extending in the same direction but one offset to the other, in which case the tool can be used in various ways. When the tool is used with the two sections in the same direction but offset, one section may be disposed upon the surface of a wall or other object to see that it is level while one end of the other section may abut against a wall or that which is being leveled, so as to hold the tool in position as shown in one of the figures of the drawings.

When the two sections are in alignment end to end, the end of the section 2 is disposed so that ribs 16 on the joined end may engage grooves 17 on the joined end of the section 3 to insure holding the sections in alignment. A side face of the section 3 near its pivoted end has a transverse groove 18 which may engage with the ribs 16 when the two sections are disposed one at right angles to the other. When the section 3 is arranged in the same direction with the section 2 but offset slightly, the corner of the section 3 engages the corner adjacent the ribs and in contact with the end face of the section 2, the ribs again acting in preventing lateral movement of the two sections relative to each other.

The head of the screw which is carried by the link is provided with a plurality of openings 20, any one of which may receive a nail or other implement for the purpose of tightening the screw and holding the sections in their different adjusted positions.

It will be noted that the drawings show the various uses of the tool illustrating the sections in different relative positions.

The invention having been set forth, what is claimed is:

1. A tool for the purpose indicated comprising a duality of sections, a coupling operatively connecting said sections and embodying a link having a pivotal connection with one of the sections and a movable pivotal connection with the other of said sections, said link being provided with a take-up device to limit the movement of the movable pivotal connection, and the sections being provided with interlocking means engageable upon the operation of said take-up device.

2. A joint comprising a pair of tool sections in end to end relation, the adjacent ends being formed with bifurcations, a link for pivotal mounting in the bifurcation of one of said sections and entering the bifurcation of the other of said sections, the last said section having a pin spanning its bifurcation and the link having an elongated slot engaging said pin, and adjustable means carried by the link and bearing upon one side of the pin to move the pin-carrying section toward the other, both of said sections having interlocking elements engageable upon the actuation of said means.

In testimony whereof he affixes his signature.

EARLE C. BALDON.